United States Patent [19]

Carstens

[11] Patent Number: 5,095,325
[45] Date of Patent: Mar. 10, 1992

[54] FLASH ADAPTOR FOR ADJUSTING THE POSITION OF A FLASH RELATIVE TO A CAMERA WHILE MAINTAINING THE FLASH IN A CONSTANT ANGULAR ORIENTATION

[76] Inventor: Peter Carstens, 34 Mountain View Drive, Minden, Ont.,, Canada, K0M 2K0

[21] Appl. No.: 657,839

[22] Filed: Feb. 14, 1991

[51] Int. Cl.⁵ ............................................. G03B 15/03
[52] U.S. Cl. ................................. 354/149.1; 354/288; 354/295; 248/309.1; 248/309.4
[58] Field of Search .................. 354/145.1, 149.1, 295, 354/288; 362/388, 398, 418, 427, 430; 248/309.4, 309.1; 335/287, 286, 285

[56] References Cited

U.S. PATENT DOCUMENTS

| | | | |
|---|---|---|---|
| 2,740,339 | 4/1956 | Carter | 354/145.1 |
| 3,204,601 | 9/1965 | Staver | 248/309.4 |
| 3,641,334 | 2/1972 | Bahnsen | 248/309.4 |
| 4,866,465 | 9/1989 | Gallegos | 354/295 |

Primary Examiner—W. B. Perkey
Assistant Examiner—Cassandra C. Spyrou
Attorney, Agent, or Firm—Rogers, Bereskin & Parr

[57] ABSTRACT

The present invention provides a flash adaptor for use with a camera. The flash adaptor comprises a camera support attachable to the camera with a flash support mounted on the camera support and moveable between first and second positions. A flash receptacle, which is located on the flash support, is provided for receiving the flash. Engagement means are also provided for releasably engaging and securing the flash support in each of the first and second positions.

18 Claims, 6 Drawing Sheets

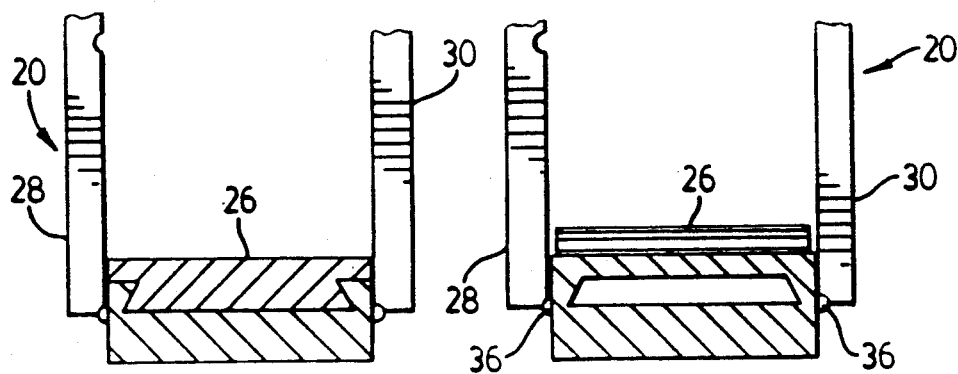
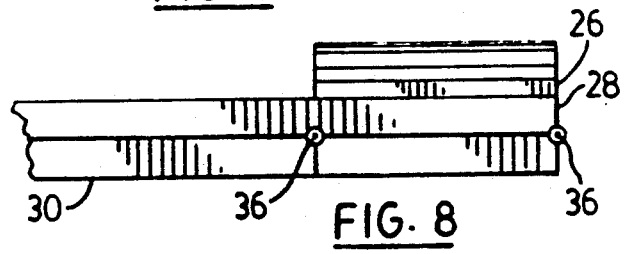
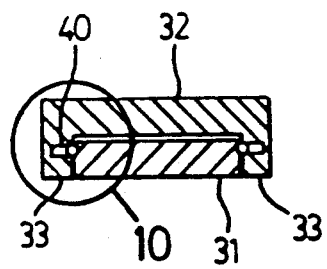
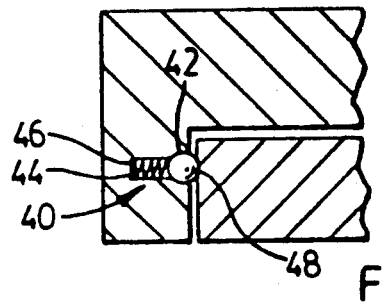
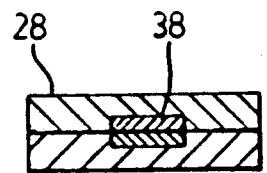
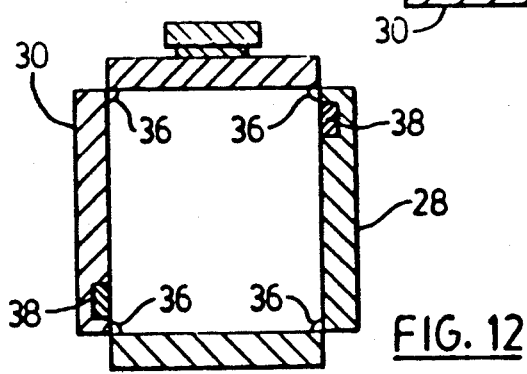

FLASH ADAPTOR FOR ADJUSTING THE POSITION OF A FLASH RELATIVE TO A CAMERA WHILE MAINTAINING THE FLASH IN A CONSTANT ANGULAR ORIENTATION

FIELD OF THE INVENTION

The present invention relates to a flash adaptor for use with a camera and flash, and in particular to a flash adaptor that permits the flash to be pivoted into a plurality of positions relative to the camera.

DESCRIPTION OF THE PRIOR ART

It is well known in the field of photography that an artificial light source should be above the camera lens for optimal lighting of the subject. Studio photographers have an assortment of lights and flash stands to provide such suitable lighting. These are not attached directly to the camera so that the studio photographer may be free to rotate his camera into a variety of positions in order to make a variety of photographs.

There are numerous instances however, where the photographer is not afforded the luxury of studio lighting. In many instances, the photographer must depend upon some form of portable electronic flash as his artificial light source. It is common for such portable flashes to be mountable directly to the camera, usually at a position above or above and to the side of the camera lens. This ensures that suitable lighting is achieved when the camera is used in an upright fashion relative to the photographer. There are times, however, when a photographer may wish to rotate his camera into a variety of positions depending on the particular photograph he wishes to take. In such cases, a fixed portable flash will not always be in a position to provide suitable lighting. Instead the flash may be to the side or even slightly below the lens relative to the photographer.

It is therefore advantageous if the flash may be moved to correspond to the various positions of the camera. It is further advantageous if such flash may be moved from one position to another in a minimal time and with a minimal effort.

The flash adaptor as claimed in the present invention enables a photographer to quickly and easily pivot the flash to correspond to the position of the camera.

SUMMARY OF THE INVENTION

The present invention provides a flash adaptor for use with a camera and a flash, where the flash adaptor comprises a camera support attachable to the camera, and a flash support mounted on the camera support and moveable between first and second positions in a plane perpendicular to the axis of a lens of the camera. There is also provided a flash receptacle, located on the flash support, for receiving the flash, where the flash receptacle maintains a constant angular orientation relative to the camera when the flash support is moved between the first and second positions. Finally, there is provided an engagement means for releasably engaging and securing the flash support in each of the first and second positions.

One embodiment of the present invention provides that the flash support include first and second side supports that extend upwards from the camera support relative to the base of the camera. Extending between and pivotally connected to the side supports parallel to the base of the camera is a cross-member which supports the flash receptacle. The combination of the side support, the camera support, and the cross-member forms a pivotable parallelogram.

Other embodiments of the present invention provide slidable tab, magnetic, detente, or quadrant engagement means for holding the flash support in each of the first and second positions.

BRIEF DESCRIPTION OF THE DRAWINGS

For a better understanding of the present invention, and to show more clearly how it may be carried into effect, reference will now be made, by way of example, to the accompanying drawings in which:

FIG. 6 is a sectional view of a flash adaptor as taken along lines 6—6 in FIG. 4;

FIG. 7 is a sectional view of the flash adaptor as taken along lines 7—7 in FIG. 4;

FIG. 8 is a view in the direction of arrow 8 of FIG. 3;

FIG. 9 is a sectional view of a flash adaptor as taken along lines 9—9 in FIG. 3;

FIG. 10 is an exploded sectional view of the locking mechanism of the flash support as shown in FIG. 9;

FIG. 11 is a sectional view of the flash support as taken along lines 11—11 in FIG. 3 of a second embodiment of the flash adaptor;

FIG. 12 is a sectional view of the flash support as taken along lines 12—12 in FIG. 4 of a second embodiment of the flash adaptor;

DESCRIPTION OF THE PREFERRED EMBODIMENTS

Figure 1:
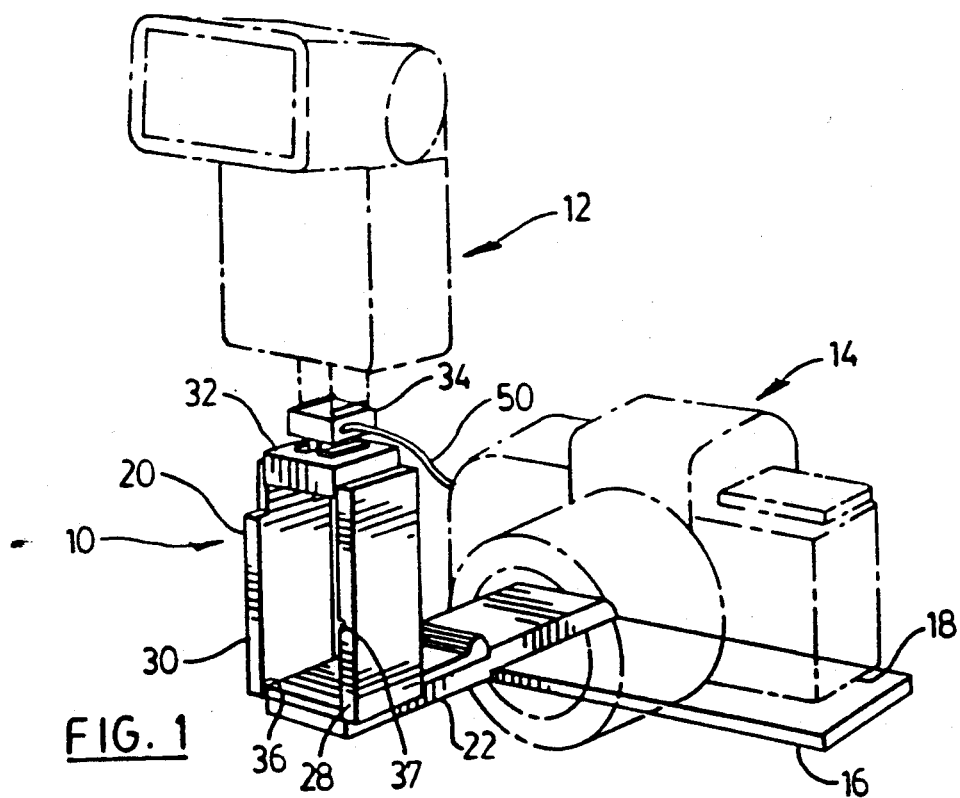
FIG. 1 is a perspective view of a flash adaptor in accordance with a first embodiment of the present invention, in use with a camera and flash (both shown in phantom), where the flash support is depicted in an upright position.
Figure 2:
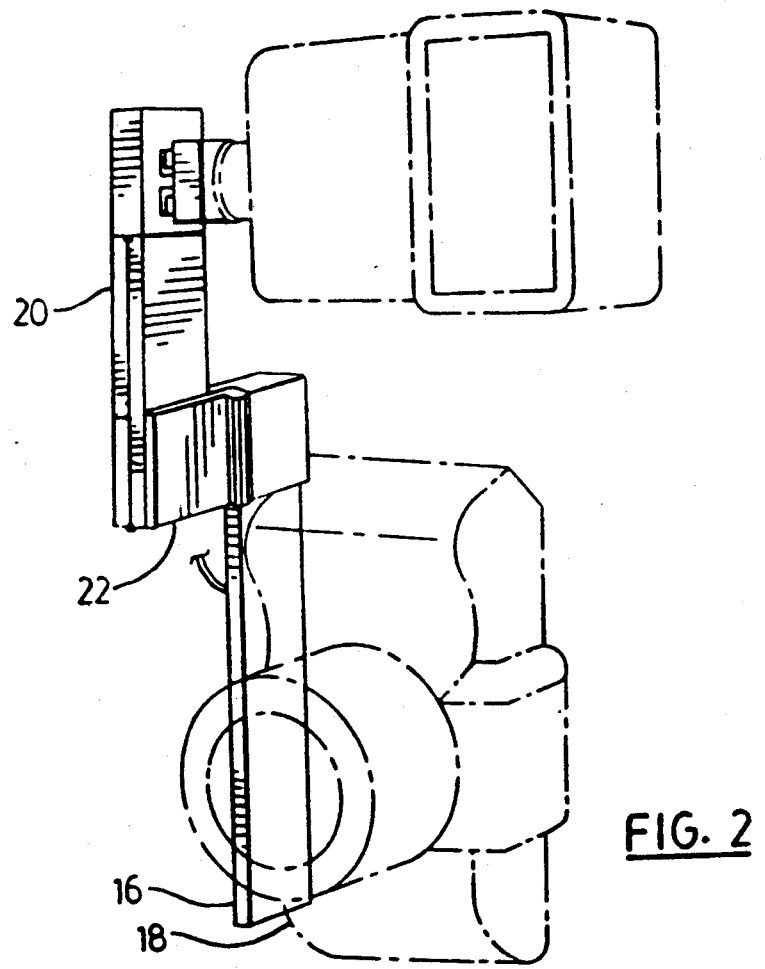
FIG. 2 is a perspective view of a flash adaptor of FIG. 1, in use with a camera and flash (both shown in phantom) where the flash support is depicted in a sideward position.

One embodiment of the flash adaptor as claimed in the present invention is shown generally at 10 in FIGS. 1 and 2. The flash adaptor is shown in use with a flash 12 and a camera 14 both indicated in phantom.

The flash adaptor has a camera support 16 that is attachable to the camera 14. In FIGS. 1 and 2, the camera support is shown attached to the base 18 of the camera 14. The camera 14 may be attached to the camera support 16 in an assortment of ways. The method preferred by the inventor consists of a series of holes 15 drilled along the center of the camera support 16 as may be seen in FIG. 3. The camera 14 may then be secured to the camera support 16 in the same fashion as a camera is secured to a tripod. The provision of a series of holes 15 enables the lateral location of the flash to be adjusted. It is conceivable that the camera support 16 of the flash adaptor 10 may be attachable to other faces of the camera 14.

Extending from the camera support 16 is a flash support 20. In the embodiment shown in FIGS. 1-5 the camera support is L-shaped with an extending arm 22. It is not essential that the camera support 16 be L-shaped. The camera support may alternatively be generally rectangular with space provided for the flash support 20 to one side of the camera 14 when the camera 14 is attached.

Figure 3:
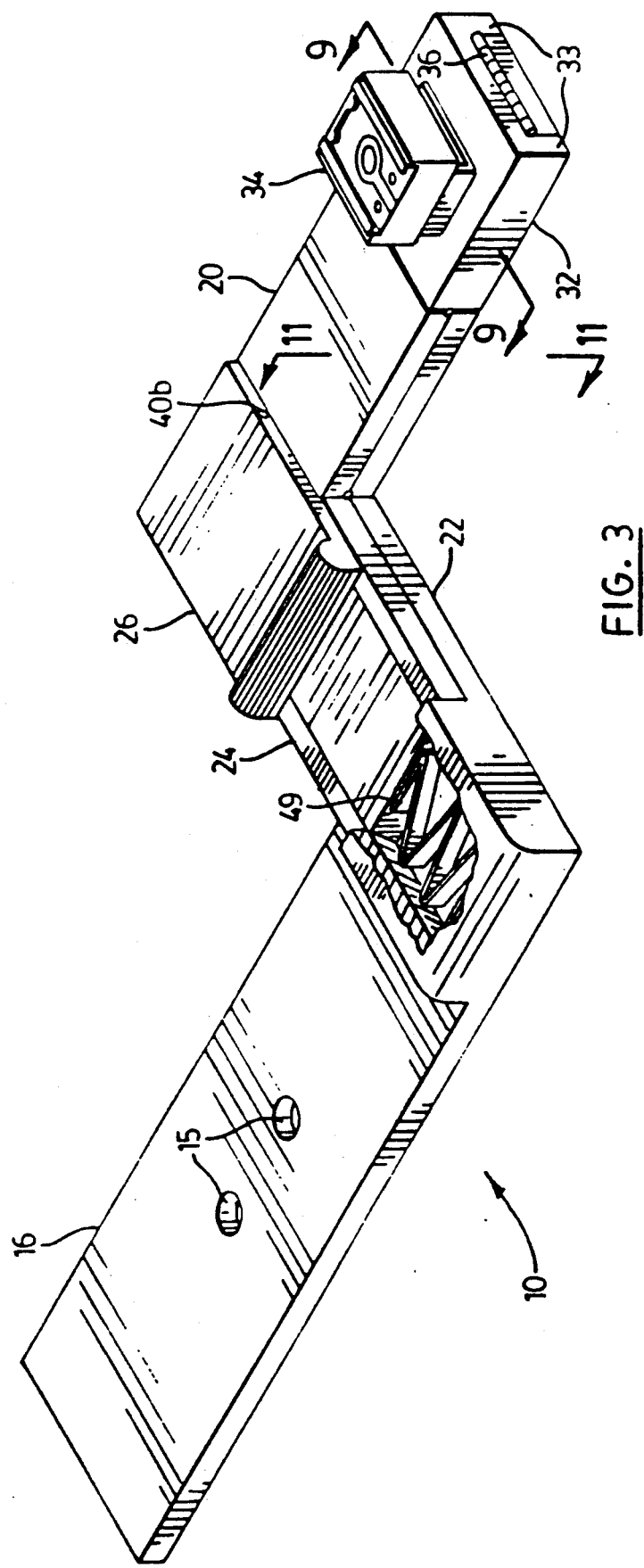
FIG. 3 is a perspective view of a flash adaptor of FIGS. 1 and 2, where the flash adaptor is depicted in a sideward position and where a portion of the flash adaptor is shown in section to reveal the biasing spring.
Figure 4:
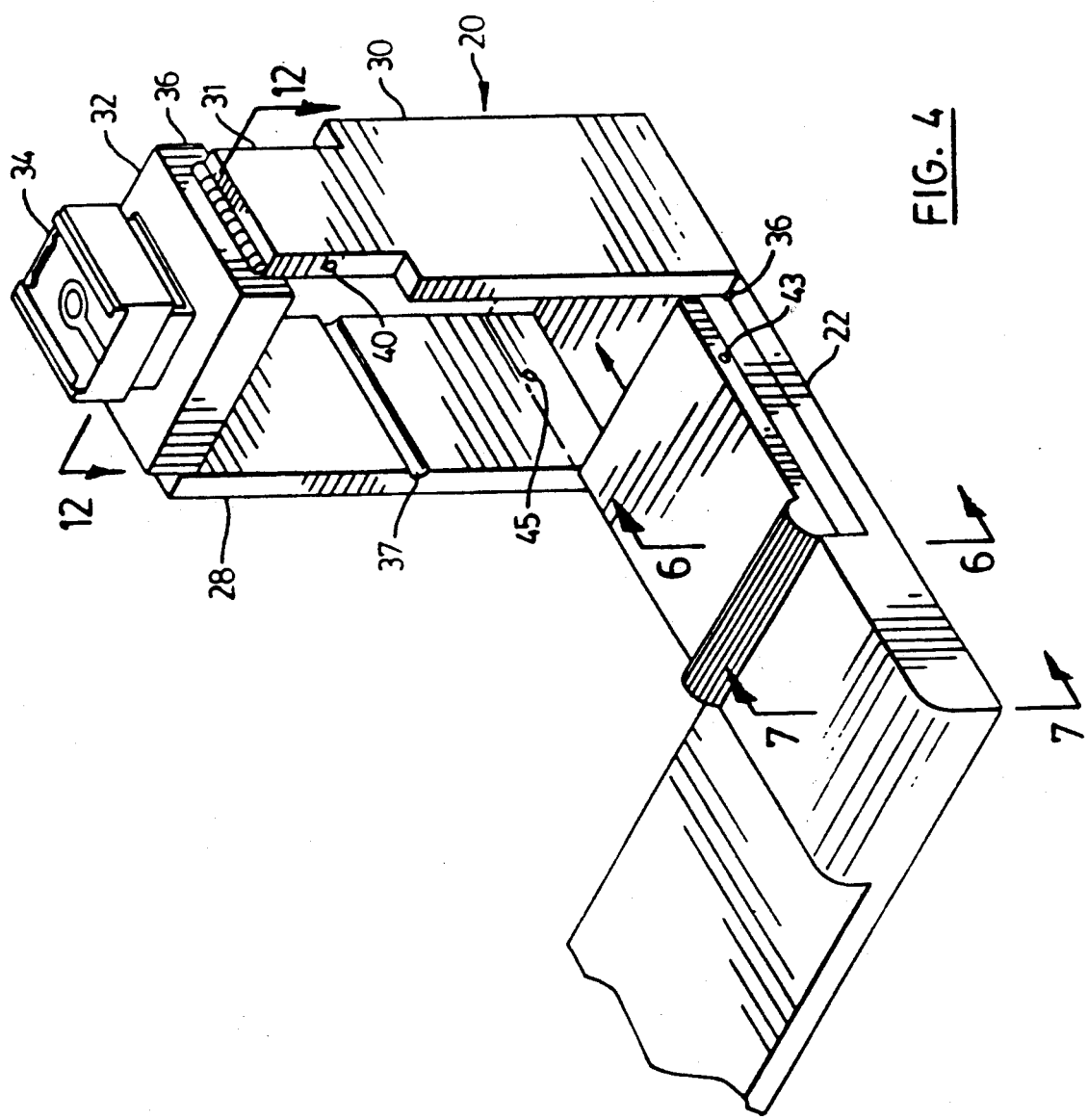
FIG. 4 is a perspective view similar to FIG. 3, where the flash support is depicted in an upright position.

The flash support 20 as illustrated in FIGS. 1 and 4 consists of a first side support 28 and a second side support 30 spanned by a cross-member 32 to form a parallelogram when the flash support 20 is in an upright position. The cross-member 32 has depending side edges 33 to form an inverted channel section that can engage an end part 31 of the second side support 30, of reduced width. The cross-member 32 supports a flash receptacle 34 as shown in FIG. 3. The flash receptacle is known in the art and is adapted to receive a portable electronic flash 12 such as is depicted in phantom in FIGS. 1 and 2.

Pivot means are provided to enable the flash support 20 to pivot relative to the camera support 16. In the preferred embodiment, the pivot means consists of a hinge 36 located at each corner of the parallelogram of the flash support 20. Each hinge 36, as shown in FIG. 4, is located on an inside corner of the parallelogram. This enables the flash support 20 to pivot from an upright position as shown in FIG. 2. Each hinge 36, as shown in FIG. 4, is a separate element that may be attached to connect the sides of the parallelogram.

Alternatively, the parallelogram may be formed from a single piece of material with integral or line hinges. In such a case, the hinge consists of the parallelogram material itself and thus is integral with other elements to the flash support 20.

Preferably, if separate hinges 36 are used, the hinges are recessed such that the first side support 28 and the cross-member 32 lay flat against the camera support 16 and the second side support 30 when the flash support is pivoted into a sideward position as shown clearly in FIG. 3. However, as shown at 37, recesses can be provided for the hinges.

The flash support 20 is locked into its desired position by way of engagement or locking means. A range of locking means is conceivable including snap locks that may incorporate magnetic or detente locking means. Several preferred methods are illustrated. These methods could be used on their own, or in combination as shown in the Figures.

In a first embodiment, the locking means consists of a detente mechanism 40 also known in the art as a bullet catch. A series of detente mechanisms 40 are shown in FIGS. 4, 9 and 10. The basic structure of the detente mechanism 40 is most clearly shown in FIG. 10. It comprises a ball 42 and spring 44 located in a bore 46 of one element. A corresponding recess 48 in another element is then adapted to receive the ball 42 under action of the spring 44. The detente mechanisms 40 are placed in such a position that the male end or ball of the detente mechanism 40 engages the female end or recess 48 to lock the flash support 20 in its desired position.

Figure 5:
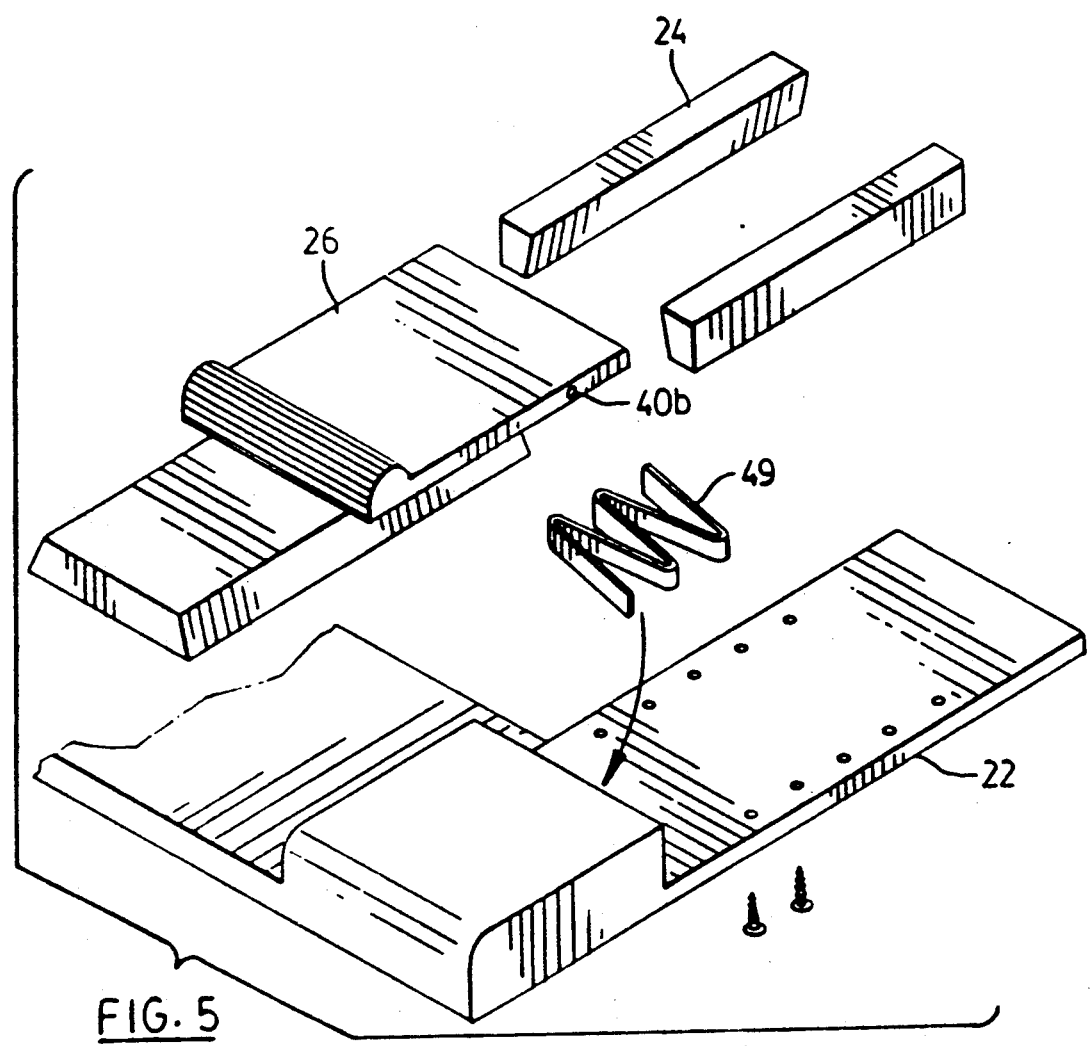
FIG. 5 is an exploded perspective view of the first embodiment of the portion of a flash adaptor showing the locking means for the flash support.

Additionally, a slidable tab 26 is located on the camera support 16. The extending arm 22 of the camera support 16 includes a U-shaped guide bar 24 that defines a trapezoidal-shaped slot. The tab 26 correspondingly includes a trapezoidal-shaped section that engages the slot to locate the tab 26. The tab 26 is shown in use in FIGS. 3 and 4. The components of the slidable tab 26 are shown in FIG. 5. The slidable tab 26 is biased into a locking position by means of a spring 49.

To lock the flash support 20 in a sideward position, the slidable tab extends over the first side support 28 of the collapsed flash support 20, under the anchor of the spring 49, as shown in FIG. 8. In this position, additional rigidity is provided by detente mechanisms 40. The corresponding recesses are provided in the side edges 33 of cross-member 32 (not shown).

To lock the flash support 20 in an upright position, the slidable tab 26 is guided between the first and second side supports 28 and 30. The width of the slidable tab 26 is generally equal to, but not greater than, the distance between the first and second side supports 28 and 30. Thus, when the slidable tab 26 is guided between the first and second side supports, the flash support 20 is locked into a generally rigid position.

Additional rigidity is provided by the detente mechanisms 43 inserted along each edge of the slidable tab 26 to engage a corresponding recess 45 located on the inside surface of each side support 28 and 30.

In this first embodiment, to displace the adaptor 10 between the upright and sidewards positions, the tab 26 is withdrawn against the action of the spring 49, and the relevant detente mechanism 40 disengaged manually. Once the new position is reached, then the tab 26 is released and the relevant detente mechanism is engaged to lock the adaptor.

In a second embodiment, the locking means consists of a plurality of magnetic locks 38 as illustrated in FIGS. 11 and 12. Magnets are embedded respectively in the first and second side supports 28 and 30. The magnets are positioned such that their opposite poles meet with an attractive force when the flash support 20 is collapsed into a sideward position as shown in FIGS. 3 and 11. The magnets will attract one another causing the flash support 20 to lock into the sideward position. The strength of the lock provided by the magnets 38 depends upon the strength of the magnets 38 and the number of magnets used. In addition to, or instead of, placing magnets in the side supports 28 and 30, magnets 38 may be embedded in the cross-member 32 and the second side support 30 in such position that their opposite poles meet with an attractive force when the flash support 20 is collapsed into a sideward position.

For the first embodiment described above, it will likely require a two-handed effort to move the adaptor between the different positions. Thus, one hand will be needed to slide the tab 26 backwards against the spring 49, whilst the other hand actually pivots the parallelogram arrangement.

It is desirable that the adaptor provide for quick and simple movement between the upright and sideward positions, which preferably should be accomplished with a one-handed operation. This is desirable both for domestic and professional use. For professional use, many news photographers are frequently in situations, for example crowded press rooms etc., where it is necessary to take a large number of photographs rapidly and in less than ideal conditions. Under those circumstances, any device which requires separate attention is simply unacceptable.

The second embodiment meets these criteria. As it is held in its two positions by magnets, it can be simply displaced between its two positions by a quick and simple one-handed operation. Thus, the user can simply grasp the flash itself and quickly move it from one position, breaking the magnetic bond, until it reaches the other position. The second pair of magnets will then firmly hold the adaptor in the other position. The retaining force provided by the magnet pairs can be selected so that the flash will be securely held in position for all routine manipulation of the camera, whilst at the same time enabling the flash to be readily moved between the two positions.

Figure 14:
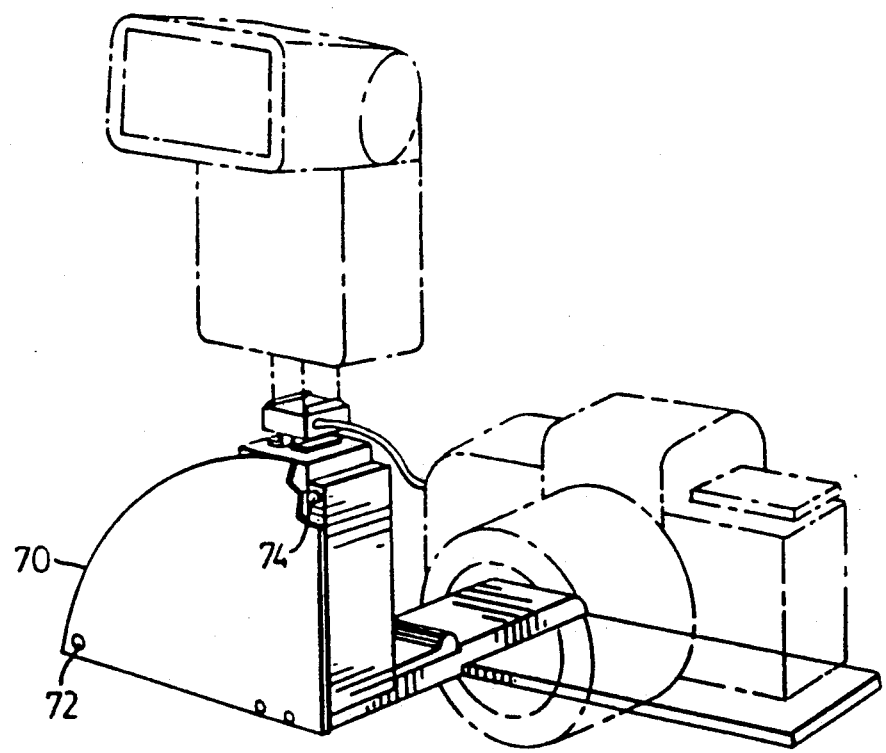
FIGS. 13 and 14 are perspective views of a third embodiment of the present invention.
Figure 13:
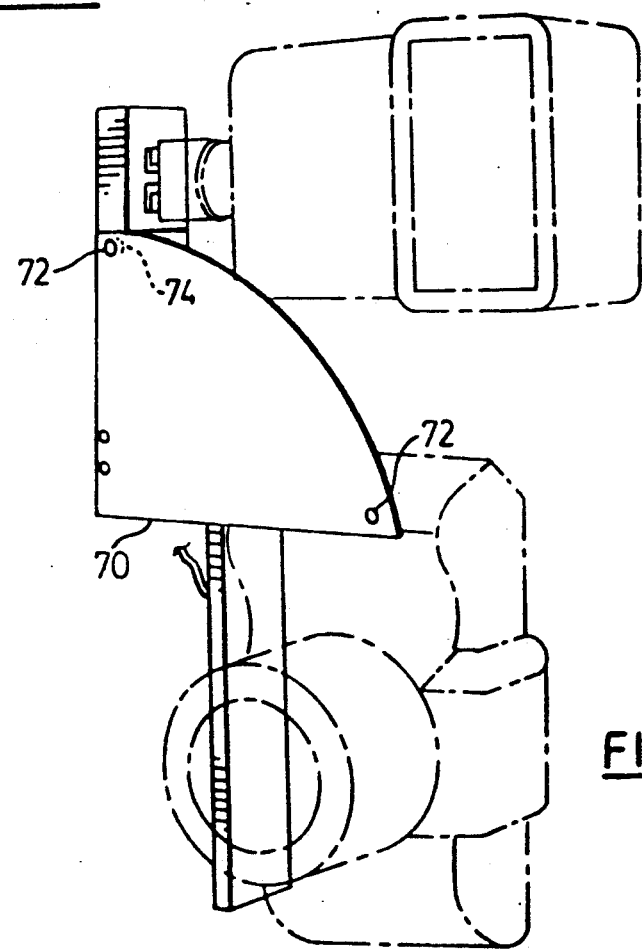

Referring now to FIGS. 13 and 14, it is shown the third embodiment of the present invention. Here, instead of the tab 26, a quadrant part 70 is integral with or mounted on the extending arm 22. This quadrant part 70 includes two recesses 72 forming the female part of a detente mechanism. The corresponding male part is again in the form of a bullet catch comprising a spring loaded ball 74 located in the first side support 28. The catch 74 is engaged with one of the corresponding recesses 72, for each of the upright or sideward positions. Again, this has the advantage that the flash can be quickly and simply moved between the two positions by a simple one-handed action. The retaining force of the detente mechanism would be selected so as to securely retain the flash, whilst permitting such one-handed action.

It will appreciated that while the described embodiments show a pivot mechanism for displacing the flash, a variety of alternative arrangements are encompassed by the present invention. Thus, it is not necessary for the flash to be maintained in the same angular orientation for both the upright and sideward positions. This is particularly the case where the flash itself does not produce a rectangular beam corresponding to the camera apperature, e.g. when the flash simply produces a circular beam. In such a case, it would be quite acceptable for the flash itself to be rotated through 90 degrees as it is displaced between the two positions.

Further, it is conceivable that the flash could be moved between the two positions by other than a rotational or pivot action. Thus, the flash receptacle could be mounted on some sort of bracket that is mounted for sliding movement along an arm slidably mounting the bracket to the arm creates a track mechanism. The arm itself would then be secured to the camera so that it extends at an angle from a position above the lens to a position beside the lens. The flash receptacle and its bracket could then simply be slid along this arm, and some mechanism provided for retaining the bracket at either end, e.g. pairs of magnets or detente mechanisms.

The elements as described above enable the flash support 20 to be pivoted into two desired positions. Namely, an upright position and a sideward position. It is conceivable that alternative forms of flash support 20, such as a flash support comprising a single side support supporting the flash receptacle, may be utilized to enable the flash support to pivot into additional positions.

The invention further provides a contact means for transmitting an electric signal from the camera 14 to the flash 12 by way of the flash receptacle 34. Such contact means may consist of a wire 50 extending from the flash receptacle 34 as is known in the art.

It is to be understood that what has been described are preferred embodiments of the invention. The invention nonetheless is susceptible to certain changes and alternative embodiments fully comprehended by the spirit of the invention as described above and the scope of the claims set out below.

I claim:

1. A flash adaptor for use with a camera and a flash, said flash adaptor comprising:
   (a) a camera support attachable to said camera;
   (b) a flash support mounted on said camera support and moveable between first and second positions in a plane perpendicular to the axis of a lens of said camera;
   (c) a flash receptacle, located on said flash support, for receiving said flash, where said flash receptacle maintains a constant angular orientation relative to said camera when said flash support is moved between said first and second positions; and
   (d) engagement means for releasably engaging and securing said flash support in each of said first and second positions.

2. A flash adaptor as claimed in claim 1, wherein the flash support is pivotally mounted to said camera support.

3. A flash adaptor as claimed in claim 1, wherein said engagement means comprises detente engagement means for holding said flash support in each of said first and second positions.

4. A flash adaptor as claimed in claim 1, wherein said engagement means comprises first and second pairs of magnets, with said first pair of magnets arranged to abut one another and hold said flash support in said first position, and said second pair of magnets arranged to abut one another and hold said flash support in said second position.

5. A flash adaptor as claimed in claim 1, further including a contact means extending between said camera and said flash receptacle or electrically connecting said flash to said camera.

6. A flash adaptor as claimed in claim 2, wherein said flash support comprises first and second side supports extending upwards from said camera support relative to the base of said camera and a cross-member extending between and pivotally connected to said side supports parallel to the base of said camera, wherein said cross-member support said flash receptacle, and wherein the side supports, the camera support, and the cross-member form elements of a pivotable parallelogram.

7. A flash adaptor as claimed in claim 6, wherein said flash support is capable of pivoting from a first upright position where said flash support is substantially above a lens of said camera, to a second sideward position where said flash support is located substantially to one side of a lens of said camera, wherein in said second position, said first side support and said cross member abut said camera support and said second side support.

8. A flash adaptor as claimed in claim 7, wherein said engagement means include at least one snap lock that enables single handed movement of said flash adaptor between said first and second positions.

9. A flash adaptor as claimed in claim 7, wherein said engagement means comprises a plurality of detente mechanisms located in said elements of said pivotable parallelogram and arranged for holding said flash support in said first and second positions.

10. A flash adaptor as claimed in claim 7, wherein said engagement means comprises a plurality of detente mechanisms located in said elements of the pivoted parallelogram and arranged for holding said flash support in each of said first and second positions.

11. A flash adaptor as claimed in claim 7, wherein said camera support includes an extending arm extending forwardly, with said first and second side supports pivotally connected to a free end of said extending arm, and a tab slidably mounted to said extending arm, wherein said tab is adapted to slide between said first and second side supports and locate them in said first position of said flash support, and wherein in said second position of said flash support, said slidable tab abuts an outer surface of one side support to hold it against said extending arm.

12. A flash adaptor as claimed in claim 11, wherein said camera support includes a biasing spring acting on said slidable tab to urge said slidable tab into engagement with said flash support.

13. A flash adaptor as claimed in claim 12, wherein said engagement means further includes magnetic engagement means and detente mechanism engagement means for additionally securing said flash support in each of said first and second positions.

14. A flash adaptor as claimed in claim 7, wherein said camera support, said side supports and said cross-member are pivotally connected by individual hinges.

15. A flash adaptor as claimed in claim 7, wherein said camera support, said side supports and said cross-member are pivotally connected by hinge elements that are integral therewith.

16. A flash adaptor as claimed in claim 7, further including a contact means extending between said camera and said flash receptacle for electrically connecting said flash to said camera.

17. A flash adaptor as claimed in claim 7, wherein said engagement means comprises a part mounted on an element of the pivotable parallelogram, said part having a surface in which two recesses are formed, said recesses forming the female end of a detent mechanism, and a spring-biased engagement member carried by another element of said pivotable parallelogram and engageable with said recesses, wherein said engagement member engages one recess to secure said flash support in said first position and engages said other recess to secure said flash support in said second position.

18. A flash adaptor as claimed in claim 17, wherein said part comprises a quadrant which is mounted on said camera support and wherein said engagement member is located in said first side support.

* * * * *